US010275597B2

(12) United States Patent
Davydov et al.

(10) Patent No.: US 10,275,597 B2
(45) Date of Patent: Apr. 30, 2019

(54) SYSTEM AND METHOD OF EXECUTION OF CODE BY AN INTERPRETER

(71) Applicant: AO Kaspersky Lab, Moscow (RU)

(72) Inventors: Vasily A. Davydov, Moscow (RU); Dmitry V. Vinogradov, Moscow (RU); Roman Y. Gavrilchenko, Moscow (RU); Dmitry A. Kirsanov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 136 days.

(21) Appl. No.: 15/446,157

(22) Filed: Mar. 1, 2017

(65) Prior Publication Data

US 2018/0165450 A1    Jun. 14, 2018

(30) Foreign Application Priority Data

Dec. 12, 2016 (RU) ................................. 2016148489

(51) Int. Cl.
    *G06F 21/53*      (2013.01)
    *G06F 21/56*      (2013.01)
    (Continued)

(52) U.S. Cl.
    CPC ............ *G06F 21/566* (2013.01); *G06F 21/53* (2013.01); *G06F 8/427* (2013.01); *G06F 9/455* (2013.01); *G06F 2221/033* (2013.01)

(58) Field of Classification Search
    CPC ...... G06F 21/53; G06F 21/561; G06F 21/566; G06F 2221/033; G06F 8/427; G06F 9/455
See application file for complete search history.

(56) References Cited

U.S. PATENT DOCUMENTS

| 7,664,626 B1 * | 2/2010 | Ferrie ................... G06F 9/455 703/23 |
| 8,151,352 B1 * | 4/2012 | Novitchi ............ G06F 9/45508 717/138 |

(Continued)

FOREIGN PATENT DOCUMENTS

| EP | 1394677 A2 | 3/2004 |
| EP | 2306356 A2 | 4/2011 |

OTHER PUBLICATIONS

Min Gyung Kang, Heng Yin, Steve Hanna, Stephen McCamant, Dawn Song. Emulating Emulation-Resistant Malware. VMSec'09, Nov. 9, 2009, Chicago, Illinois, USA.

*Primary Examiner* — Linglan E Edwards
(74) *Attorney, Agent, or Firm* — Arent Fox LLP; Michael Fainberg (57) ABSTRACT

Disclose are systems and methods for execution of program code by an interpreter. One exemplary method comprises: executing, by the interpreter, instructions of the program code in an emulated computer environment; when detecting, by the interpreter, an instruction of the program code associated with an unknown object for which the interpreter lacks a rule of interpretation, halting by the interpreter further execution of the instructions of the program code; obtaining, by the interpreter, an auxiliary code whose result of execution corresponds to the result of the execution of the unknown object, wherein the auxiliary code contains known objects for which the interpreter has a rule of interpretation; executing, by the interpreter, the instructions of the auxiliary code; and after completion of the execution of the auxiliary code, by the interpreter, resuming the execution of the instructions of the program code.

20 Claims, 4 Drawing Sheets

(51) Int. Cl.
 *G06F 8/41* (2018.01)
 *G06F 9/455* (2018.01)

(56) References Cited

U.S. PATENT DOCUMENTS

| | | | | |
|---|---|---|---|---|
| 8,763,125 | B1* | 6/2014 | Feng | G06F 21/56 |
| | | | | 713/175 |
| 8,910,286 | B2* | 12/2014 | Belov | G06F 21/566 |
| | | | | 726/22 |
| 9,063,760 | B2* | 6/2015 | Cook | G06F 9/455 |
| 9,680,864 | B2* | 6/2017 | Khesin | G06F 21/568 |
| 9,740,864 | B2* | 8/2017 | Pintiysky | G06F 21/566 |
| 9,858,416 | B2* | 1/2018 | Niemela | G06F 21/566 |
| 2012/0266244 | A1 | 10/2012 | Green et al. | |
| 2016/0196368 | A1* | 7/2016 | Momot | G06F 17/5009 |
| | | | | 703/22 |
| 2016/0196425 | A1* | 7/2016 | Davidov | G06F 21/566 |
| | | | | 726/23 |

\* cited by examiner

SYSTEM AND METHOD OF EXECUTION OF CODE BY AN INTERPRETER

CROSS-REFERENCE TO RELATED APPLICATIONS

This application claims benefit of priority under 35 U.S.C. 119(a)-(d) to a Russian Patent Application No. 2016148489 filed Dec. 12, 2016, which is incorporated by reference herein.

FIELD OF TECHNOLOGY

The disclosure relates generally to the field of interpreters, and more specifically to systems and method for execution of program code by an interpreter.

BACKGROUND

Emulators are being increasingly used by antivirus applications for analysis of computer program code for the presence of a malicious functionality. Such method is usually employed to analyze a code written in script programming languages. Generally, the emulator includes a syntactical analyzer (parser) and an interpreter. The syntactical analyzer converts the program code being analyzed into an intermediate code (such as byte code). The interpreter, using the intermediate code and an emulated execution environment, successively executes (i.e., interprets) the instructions of the intermediate code in accordance with the rules of interpretation. During the emulation, the code being analyzed has no access to the resources of the actual computer system, since its execution takes place in the emulated environment. Thus, the code being executed in the emulator cannot delete or alter files on the computer, read data from the files, or otherwise inflict harm on the computer system in which it runs.

At the same time, it is quite difficult to implement an emulator which is able to interpret all objects (functions, procedures and methods, instances of classes, and so forth) of a code being executed. Cybercriminals make use of this fact and often include rarely used objects in their program code. Therefore, if the returned value of a particular object (e.g., a function) does not correspond to the expected value of execution of this object, the malicious code "understands" that it is being executed inside an emulator and ceases its further execution or does not execute the malicious functionality, so as not to be detected.

In turn, the makers of antivirus applications strive to efficiently add rules of interpretation to the emulators for new objects included by cybercriminals in their malicious code. However, this usually requires a changing of the program code of the emulator itself. After each such change, a testing and debugging of the program code of the emulator is required and thus the updated version of the emulator cannot be provided efficiently to the users of the antivirus. A technical problem arises, consisting in the need for interpretation (i.e., execution by an interpreter) of instructions of an investigated program code that contain objects for which the interpreter lacks a rule of interpretation (i.e., a program code whose result of execution corresponds to the result of the execution of the corresponding instruction), without changing the actual program code of the interpreter. The object may be a procedure, a class instance, a method or variable of a class instance, a script or even a file.

However, the existing antivirus technologies often unable to detect malicious code containing objects for which the emulator, and more specifically its interpreter, lacks a rule of interpretation and thus does not solve the aforementioned technical problem.

SUMMARY

The present invention is directed to systems, methods and computer program products for execution of program code by an interpreter for which the interpreter lacks rules of interpretation. One of the technical result of the present invention consists in improving the quality of execution by the interpreter of the investigated program code for which the interpreter lacks a rule of interpretation, without altering the interpreter itself, by interpreting an auxiliary program code.

In one exemplary aspect, a method of execution of program code by an interpreter comprises: executing, by the interpreter, instructions of the program code in an emulated computer environment; when detecting, by the interpreter, an instruction of the program code associated with an unknown object for which the interpreter lacks a rule of interpretation, halting by the interpreter further execution of the instructions of the program code; obtaining, by the interpreter, an auxiliary code whose result of execution corresponds to the result of the execution of the unknown object, wherein the auxiliary code contains known objects for which the interpreter has a rule of interpretation; executing, by the interpreter, the instructions of the auxiliary code; and after completion of the execution of the auxiliary code, by the interpreter, resuming the execution of the instructions of the program code.

In one exemplary aspect, the object being one of: a procedure, an instance of a class, a method or variable of an instance of a class, a script, a file, an auxiliary code.

In one exemplary aspect, the auxiliary code is obtained from the emulated computer environment.

In one exemplary aspect, the auxiliary code is obtained from a local database or a remote database.

In one exemplary aspect, the execution environment of the interpreter is initialized for the auxiliary code.

In one exemplary aspect, the execution of the code and the execution of the auxiliary code includes one or more of: performing lexical analysis of the code; performing syntactical analysis of the code; creating an intermediate code; and interpreting the intermediate code according to the rules of interpretation.

In one exemplary aspect, the auxiliary code additionally contains at least one other unknown object for which another auxiliary code is obtained, the result of the execution of said other auxiliary code corresponding to the result of execution of the other unknown object.

In one exemplary aspect, the method further comprises: performing an antivirus check of the interpreted code.

In one exemplary aspect, a system of execution of program code by an interpreter comprises a hardware processor executing an interpreter in an emulated computer environment, wherein the interpreter configured to: execute instructions of the program code; when detecting, by the interpreter, an instruction of the program code associated with an unknown object for which the interpreter lacks a rule of interpretation, halt further execution of the instructions of the program code; obtain an auxiliary code whose result of execution corresponds to the result of the execution of the unknown object, wherein the auxiliary code contains known objects for which the interpreter has a rule of interpretation; execute the instructions of the auxiliary code; and after completion of the execution of the auxiliary code, resume the execution of the instructions of the program code.

In one exemplary aspect, a non-transitory computer readable medium storing thereon computer executable instructions for executing program code by an interpreter, includes instructions for: executing, by the interpreter, instructions of the program code in an emulated computer environment; when detecting, by the interpreter, an instruction of the program code associated with an unknown object for which the interpreter lacks a rule of interpretation, halting by the interpreter further execution of the instructions of the program code; obtaining, by the interpreter, an auxiliary code whose result of execution corresponds to the result of the execution of the unknown object, wherein the auxiliary code contains known objects for which the interpreter has a rule of interpretation; executing, by the interpreter, the instructions of the auxiliary code; and after completion of the execution of the auxiliary code, by the interpreter, resuming the execution of the instructions of the program code.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects on the invention are described herein in the context of a system, method and computer program product for execution of program code by an interpreter. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
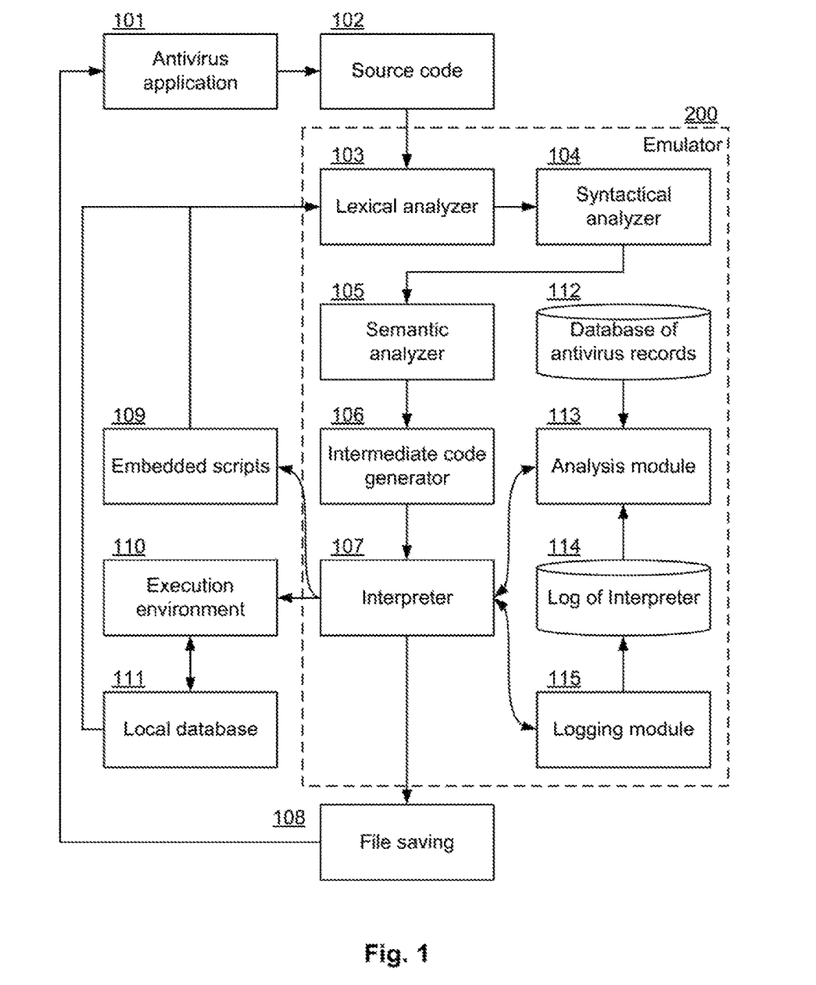
FIG. 1 illustrates an exemplary system for execution of program code by an interpreter.

FIG. 1 illustrates an exemplary system for execution of program code by an interpreter according to one aspect of the present invention. The antivirus application 101 is a computer program providing information security on a computer system on which it is deployed. The antivirus application 101 passes program code 102 for analysis to emulator 200. In one exemplary aspect, the emulator 200 is part of the antivirus application 101. The source program code 102 can be written in a script programming language, such as JavaScript, VB Script, Python and others. In one exemplary aspect, the emulator 200 may include, but not limited to, a lexical analyzer 103, a syntactical analyzer 104, a semantic analyzer 105, an intermediate code generator 106, an interpreter 107, a logging module 115 and an analysis module 113. In one exemplary aspect, the interpreter 107 contains a virtual machine.

In one exemplary aspect, the lexical analyzer 103 reads the string of characters constituting the source program code 102, and groups these characters into meaningful sequences, or lexemes. For each lexeme, an output token is constructed and passed to the syntactical analyzer 104. The syntactical analyzer 104 uses the tokens to create a treelike intermediate code which describes the grammatical structure of the string of tokens, or a syntax tree. The semantic analyzer 105 uses the syntax tree to check the source program code for semantic consistency with a language definition. The intermediate code generator 106 creates an intermediate code, which is passed to the interpreter 107. The intermediate code is unified and not dependent on the language in which the source code 102 is written.

The interpreter 107 executes (or interprets) the code in an execution environment 110. The execution environment 110 (run-time environment) solves the problems of the allocation scheme and memory for the named objects of the code being executed, and provides mechanisms for access to variables, links between procedures, mechanisms of transfer of parameters, interaction with the operating system, with the I/O devices, and with other programs. Accordingly, the initialization of the execution environment 110 involves assignment of memory and providing access to the variables and the data to the interpreter 107. It should be noted that the interpreter 107 can only execute the intermediate code created by the intermediate code generator 106. For convenience of description, the terms investigated code and intermediate code are considered to be equivalent. The intermediate or investigated code is a machine-independent code (it will be executed by the interpreter for different computer architectures). Thus, regardless of the programming language in which the source code 102 was written, and due to the working of the lexical, syntactical and semantic analyzers 103-105 and the intermediate code generator 106, an investigated code will be created from the unified linguistic grammar, which the interpreter 107 will be able to execute.

The local database 111 is linked to the execution environment 110 and contains the rules of interpretation for the objects of the investigated code. In one exemplary aspect, an object is one of: a procedure, an instance of a class, a method or variable of an instance of a class. In yet another exemplary aspect, the investigated code may contain an embedded script code section 109, and also code for working with files 108, which are likewise objects. In this case, the execution of the code by the interpreter 107 will be done recursively. The embedded script, for example, has not been converted into intermediate code and consequently cannot be executed by the interpreter 107. Thus, the embedded script 109 will have to be dispatched once more to the lexical analyzer 103 in order for the intermediate code generator 106 to create an intermediate code which will be executed by the interpreter 107.

If, in the process of execution of the investigated code, a file was saved to disk 108, the content of this file may also be executed by the interpreter 107. However, the file content contains nonconverted code, and therefore the file will be handed over to the antivirus 101, with subsequent conversion of the code by the modules 103-106 into intermediate code.

It should be noted that the present invention is not limited to the field of computer security and the use of interpreters for the antivirus scans of program code. However, it should likewise be underscored that the invention can be applied in any other field of computer technology where the execution of code by an interpreter is used, for example, to simplify the method of updating the rules of interpretation in a code interpreter.

In one exemplary aspect, the interpreter 107 can be additionally linked to a logging module 115, which can perform a recording in the log of the interpreter 114 during the course of the execution of each instruction of the intermediate code in the interpreter 107.

In one exemplary aspect, the analysis module 113 is configured to check the records of the log of the interpreter 114 for concurrence with the records of the database of antivirus records 112 according to the antivirus rules. The antivirus rules specify conditions under which the investigated file is recognized as being malicious or not malicious. If said records concur, the investigated code is determined to be malicious, and the analysis module 113 hands over this information to the interpreter 107. The interpreter 107 in this case ceases further execution of the code and hands over control to the antivirus 101, which alerts the computer user to the discovered threat (malicious file) and takes appropriate steps to eliminate the malicious content of the investigated code.

Table 1 below presents an example of antivirus records which concur in the log of the interpreter 114 and in the database of antivirus records 112. Usually the antivirus records are called signatures. The first record of the table contains the record open, meaning that a request was made to obtain a file located at a URL address: "http://*************exe*.jpg" ("*" means any given characters). The second record means that the request made was dispatched to a URL address. The third record means a saving of the data to the file "c:\\temp\\*********.exe". And the fourth record means starting the execution of the saved file. It is obvious that the consecutive execution of these four actions is usually characteristic of a malicious file. Therefore, the antivirus rule in this example will be as follows: if the log of the interpreter 114 contains a sequence of records 1-4 of table 1, the investigated code is given the verdict "HEUR:Trojan-Downloader.Script.Generic:" (see table 2). This verdict means that the investigated code and accordingly the source code 102 are a malicious file—a Trojan downloader.

Figure 2:
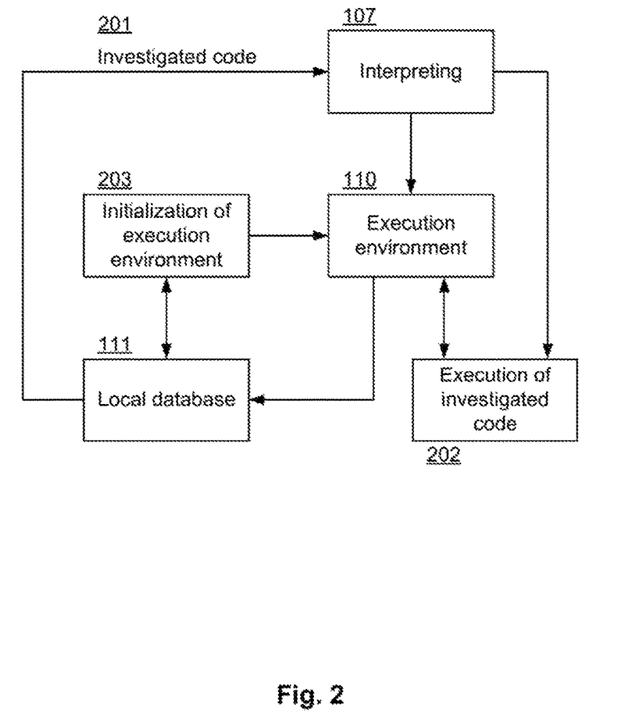
FIG. 2 illustrates an exemplary system for execution of program code by an interpreter.

FIG. 2 illustrates an exemplary system for execution of program code by an interpreter according to one aspect of the invention. The interpreter 107 is used for the consecutive execution of each instruction of the investigated code (the intermediate code) 201. When the interpreter 107 moves on to execute an instruction of the investigated code 201 containing an object for which the interpreter lacks a rule of interpretation (i.e., an unknown object), the further execution of the investigated code 201 is halted. A rule of interpretation is a program code whose result of execution corresponds to the result of execution of the corresponding instruction. Next, the interpreter 107 obtains an auxiliary code whose result of execution corresponds to the result of execution of the unknown object, the auxiliary code containing those objects (i.e., unknown objects) for which the interpreter 107 has a rule of interpretation. Then the interpreter consecutively executes each instruction of the auxiliary code, and after completing the execution of the auxiliary code the interpreter 107 resumes the execution of the investigated code 201 with the next instruction of the investigated code 201, until such time as the last instruction of the investigated code 201 has been executed.

In a one exemplary aspect, the object is one of the following: a procedure, a class instance, a method or variable of a class instance, a script, a file.

Figure 3:
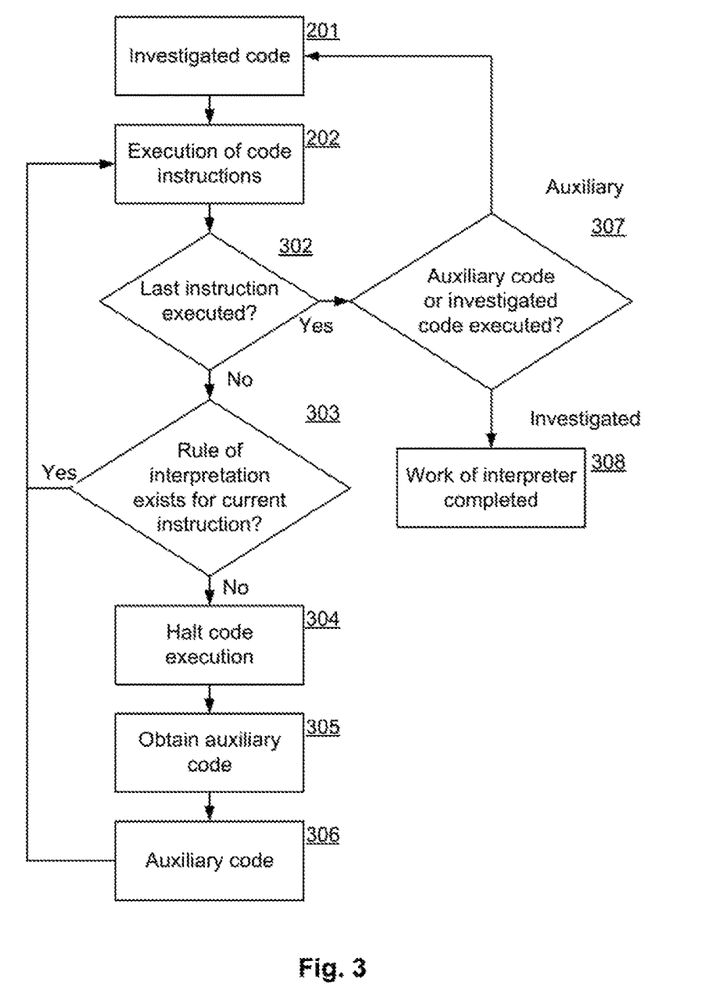
FIG. 3 illustrates an exemplary method for execution of program code by an interpreter.

FIG. 3 illustrates an exemplary method for execution of program code by an interpreter. The investigated code 201 arrives at the input of the interpreter 107 and, in step 301, the interpreter 107 consecutively executes each instruction of the investigated code 201 in step 202. When the interpreter 107 begins to execute an instruction of the investigated code 201 containing an object (unknown object) for which the interpreter 107 lacks a rule of interpretation (verification in step 303), the further execution of the investigated code is halted in step 304, and in step 305 the interpreter obtains an auxiliary code 306, the result of whose execution corresponds to the result of execution of the aforementioned unknown object, the auxiliary code 306 containing only those objects (unknown objects) for which a rule of interpretation is present in the interpreter 107. Next, the auxiliary code 306 is handed over for execution to the interpreter 107 in step 301, where it consecutively executes each instruction of the auxiliary code 306, and after completing the execution of the auxiliary code 306 it resumes the execution of the investigated code 201 in step 301 with the next instruction of the investigated code 201. Verification of the completion of execution of the auxiliary code 306 occurs in step 302 and 307. The working of the method of the invention goes on until the moment when the last instruction of the investigated code 201 is executed. This condition is verified in step 302 and 307. After executing the last instruction of the investigated code 201, the work of the interpreter 107 is finished in step 308.

In a one exemplary aspect, in step 301 the interpreter 107 initializes the execution environment 110 of the interpreter

TABLE 1

| No | Name | Content |
|---|---|---|
| 1 | open | msxml2.xmlhttp.open("get","http://**************exe*.jpg") |
| 2 | send | msxml2.xmlhttp.send("[get,http://****************exe*.jpg]") |
| 3 | save | adodb.stream.savetofile("c:\\temp\\*********.exe","2") |
| 4 | exec | wscript.shell.run("c:\\temp\\*********.exe","0","0") |

TABLE 2

| Antivirus rule |
|---|
| $on (open -> send -> save -> exec) |
| { |
|     $verdict("HEUR:Trojan-Downloader.Script.Generic"); |
| } |

107 (step 203). In yet another exemplary aspect, the auxiliary code 306 is contained in the execution environment 110 of the interpreter 107 and in step 305 the auxiliary code 306 is obtained from the execution environment 110.

In one exemplary aspect, the auxiliary code 306 is obtained from a local database 111. In this case, the execution environment (step 203) for the auxiliary code 306 may be initialized, since upon initialization the execution environment 110 for the interpreter 107 does not contain the objects and variables used by the auxiliary code 306.

In one exemplary aspect, the auxiliary code 306 is obtained from a remote database (not shown in the figure) when said auxiliary code 306 is absent from the local database 111.

In one exemplary aspect, a logging module 115 is used to record in the log of the interpreter 114 each instruction or portion of an instruction of the code during execution (in step 301). The list of instructions for which it is necessary to make a record in the log of the interpreter 114 may be contained in the emulator 200. An analysis module 113 is used to check the matching of the records in the log of the interpreter 107 and in the database of antivirus records 112 according to the antivirus rules when making said records. If said records match, the investigated code 102 is found to be malicious.

In one exemplary aspect, the execution of the code and the execution of the auxiliary code involve the following steps: lexical analysis with the use of a lexical analyzer 103, syntactical analysis with the use of a syntactical analyzer 104, semantic analysis with the use of a semantic analyzer 105, creation of an intermediate code by an intermediate code generator 106 and interpreting of the intermediate code according to the rules of interpretation by means of the interpreter 107.

It should be noted that the auxiliary code 306 can be written either in the language of the source code 102 or in the language of the converted investigated code 201, i.e., in converted form. For example, if the source language is JavaScript, then the converted language is a byte-code of a virtual Java machine. In one exemplary aspect, when the auxiliary code 306 is written in the language of the source code 102, the auxiliary code 306 will at first be handed over to the lexical analyzer 103, then to the syntactical analyzer 104 and the semantic analyzer 105 and, finally, the intermediate code generator 106 will construct from the auxiliary code 306 an auxiliary code in converted form, which will then be executed by the interpreter 107. In one exemplary aspect, after the conversion of the auxiliary code 306 it may be saved in converted form along with the nonconverted auxiliary code 306 or in a separate storage/cache. When this auxiliary code is next requested by the interpreter 107, the auxiliary code in converted form will then be returned to the interpreter 107.

In another exemplary aspect, when the auxiliary code 306 has initially been provided in converted form, it will be dispatched at once to the interpreter 107 for execution.

Table 3 below presents an example of a portion of a source code 107 which is malicious. For better understanding, the actual source code 102 is given, and not the converted investigated code 201. Line 4 contains an invoking of the object "Scripting.Dictionary", for which a rule of interpretation was lacking in the beginning. In this example, the object "Scripting.Dictionary" is an unknown object. Therefore, in step 4, the execution of the investigated code at the interpreter 107 will be halted, and the interpreter 107 will be provided with the auxiliary code 306 from table 4, whose result of execution corresponds to the result of execution upon invoking the object "Scripting.Dictionary" in line 4 of table 3. After executing the auxiliary code 306, the execution of the investigated code will be resumed from line 5 of table 3 onward. The auxiliary code 306 from table 4 contains only those objects (unknown objects) for which a rule of interpretation is present in the interpreter 107.

It should be noted that the invoking of rare objects, such as functions, is usually characteristic of malicious files—in this way the malicious file checks whether it is being executed in an emulator, and not in a real computer.

TABLE 3

| Line | Source code |
|---|---|
| 1 | var yoryymvz=3; |
| 2 | var izzfhhpg=jiijyamm.split(""); |
| 3 | var rtrslnmj=""; |
| 4 | var y=new ActiveXObject("Scripting.Dictionary"); |
| 5 | y.add("a","t"); |
| 6 | if (y.Item("a")=="t") |
| 7 | { |
| 8 | rtrslnmj="bjd"; |
| 9 | } |
| 10 | else |
| 11 | { |
| 12 | yoryymvz=0; |
| 13 | } |
| 14 | ; |
| 15 | for (i=0; i<izzfhhpg.length; i+=yoryymvz) |
| 16 | { |
| 17 | bsvuyeigy=bsvuyeigy+izzfhhpg[i]; |
| 18 | } |
| 19 | var rtrslnmj="bjdebjdvbjdabjdl".split(rtrslnmj).join(""); |
| 20 | this[rtrslnmj](bsvuyeigy); |

TABLE 4

| Line | Auxiliary code |
|---|---|
| 1 | obj = { }; |
| 2 | obj.prototype.add = function(p1, p2) |
| 3 | { |
| 4 | this[p1] = p2; |
| 5 | } |
| 6 | obj.prototype.Item = function(p) |
| 7 | { |
| 8 | return this[p]; |
| 9 | } |
| 10 | Scripting.Dictionary = obj; |

In yet another exemplary aspect, the auxiliary code 306 may further contain other unknown objects for which a corresponding other auxiliary code can be obtained, whose result of execution corresponds to the result of execution of the other unknown object.

Table 5 presents an example of known objects. Table 6 presents an example of how the auxiliary code for unknown objects contains known and unknown objects.

For example, the auxiliary code for the unknown object G contains only the known objects A, B, C. At the same time, the auxiliary code for the unknown object H contains both known objects A, B, and another unknown object G. But for the other unknown object G there is also present another auxiliary code, which in turn is dependent on known objects A, B, C.

Thus, in the given example, when an instruction in the investigated code 201 is executed in step 202 that contains the unknown object H, the execution of the investigated code will be halted at step 304. Then the auxiliary code 306 for the object H will be obtained in step 305, whose execution will be continued in step 202. When executing the auxiliary code for the object H, if an instruction is executed that contains the other unknown object G, a different auxiliary code will now be obtained in step 305 for the other unknown object G, whose execution will continue in step 202. After completing the execution of the other auxiliary code for the object G, the execution of the auxiliary code 306 for the object H will continue, and then after completing the execution of the auxiliary code 306 for the object H the execution of the investigated code 201 will be continued. Obviously, the investigated code 201 may contain other unknown objects for which once more obtaining an auxiliary code is required. Furthermore, the dependency of unknown objects on known objects may be embedded as deeply as desired.

TABLE 5

| Known objects |
| --- |
| A, B, C, D, E, F |

TABLE 6

| Unknown object | Auxiliary code contains objects |
| --- | --- |
| G | A, B, C |
| H | A, B, G |

One technical result of the systems and method of the present invention described above, consisting in improvement of the quality of execution by the interpreter of the investigated program code, is achieved by the interpreting of an auxiliary program code. The improvement of the quality of execution by the interpreter of the investigated program code consists in the fact that the interpreter continues to execute the investigated program code even when the investigated program code contains objects for which the interpreter lacks a rule of interpretation. The known interpreters and emulators of the prior art complete their execution with an error when executing instructions which contain unknown functions.

Another technical result of the systems and method of the present invention described above, consisting in enabling the execution by the interpreter of instructions of the investigated program code for which the interpreter lacks a rule of interpretation, without altering the interpreter itself, is achieved by the interpreting of an auxiliary program code. This technical result is achieved because, due to the executing of the auxiliary code by the interpreter, the execution of the investigated code will not be halted on account of the absence of any rule of interpretation for instructions for which interpreter lacks a rule of interpretation.

Figure 4:
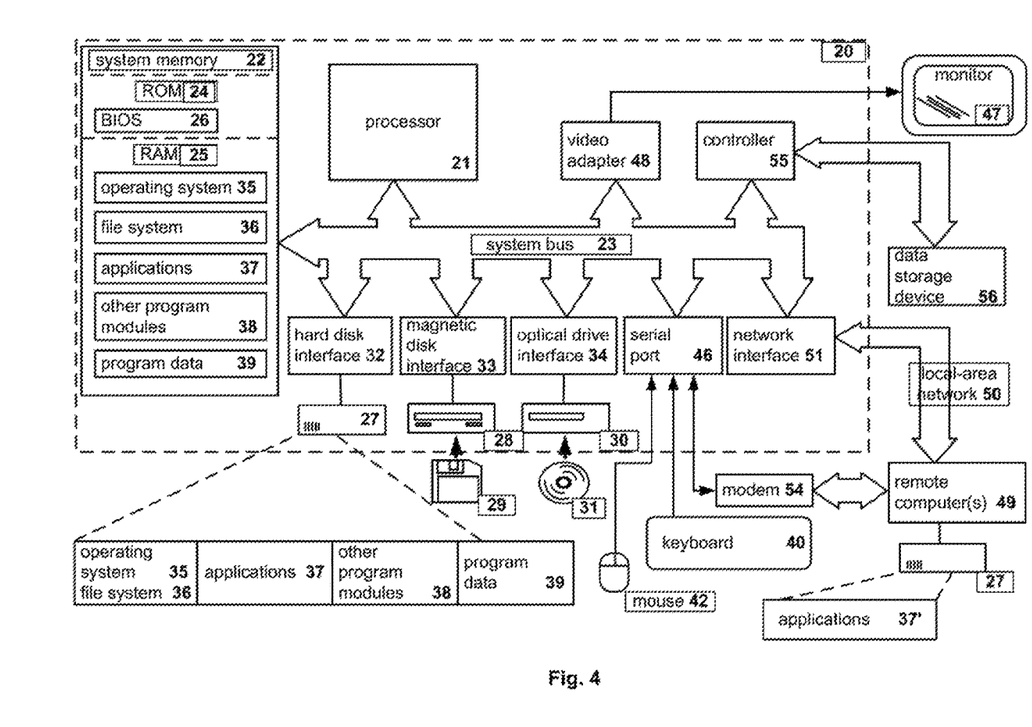
FIG. 4 illustrates an example of a general-purpose computer system on which the aspects of the systems and methods for execution of program code by an interpreter can be implemented.

FIG. 4 is an example of a general-purpose computer system on which the aspects of the systems and methods for execution of program code by an interpreter can be implemented. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of execution of program code by an interpreter, the method comprising:

executing, by the interpreter, instructions of the program code in an emulated computer environment;
in response to detecting, by the interpreter, an instruction of the program code associated with an object for which the interpreter lacks a rule of interpretation, halting by the interpreter further execution of the instructions of the program code;
obtaining, by the interpreter, an auxiliary code corresponding to the object, wherein a result of execution of the auxiliary code corresponds to the result of the execution of the object, and wherein the auxiliary code contains objects for which the interpreter has a rule of interpretation;
executing, by the interpreter, the instructions of the auxiliary code; and
after completion of the execution of the auxiliary code, by the interpreter, resuming the execution of the instructions of the program code.

2. The method of claim 1, wherein the object being one of: a procedure, an instance of a class, a method or variable of an instance of a class, a script, a file, an auxiliary code.

3. The method of claim 1, wherein the auxiliary code is obtained from the emulated computer environment.

4. The method of claim 1, wherein the auxiliary code is obtained from a local database or a remote database.

5. The method of claim 1, wherein the execution environment of the interpreter is initialized for the auxiliary code.

6. The method of claim 1, wherein the execution of the code and the execution of the auxiliary code includes one or more of: performing lexical analysis of the code; performing syntactical analysis of the code; creating an intermediate code; and interpreting the intermediate code according to the rules of interpretation.

7. The method of claim 1, wherein the auxiliary code additionally contains at least one other object for which another auxiliary code is obtained, the result of the execution of said other auxiliary code corresponding to the result of execution of the other object.

8. The method of claim 1, further comprising: performing an antivirus check of the interpreted code.

9. A system of execution of program code by an interpreter, the system comprising:

a hardware processor executing an interpreter in an emulated computer environment, wherein the interpreter is configured to:
execute instructions of the program code;
in response to detecting, by the interpreter, an instruction of the program code associated with an object for which the interpreter lacks a rule of interpretation, halt further execution of the instructions of the program code;
obtain an auxiliary code corresponding to the object, wherein a result of execution of the auxiliary code corresponds to the result of the execution of the object, and the auxiliary code contains objects for which the interpreter has a rule of interpretation;
execute the instructions of the auxiliary code; and
after completion of the execution of the auxiliary code, resume the execution of the instructions of the program code.

10. The system of claim 9, wherein the object being one of: a procedure, an instance of a class, a method or variable of an instance of a class, a script, a file, an auxiliary code.

11. The system of claim 9, wherein the auxiliary code is obtained from the emulated computer environment.

12. The system of claim 9, wherein the auxiliary code is obtained from a local database or a remote database.

13. The system of claim 9, wherein the execution environment of the interpreter is initialized for the auxiliary code.

14. The system of claim 9, wherein the execution of the code and the execution of the auxiliary code includes one or more of: performing lexical analysis of the code; performing syntactical analysis of the code; creating an intermediate code; and interpreting the intermediate code according to the rules of interpretation.

15. The system of claim 9, wherein the auxiliary code additionally contains at least one other object for which another auxiliary code is obtained, the result of the execution of said other auxiliary code corresponding to the result of execution of the other object.

16. The system of claim 9, further comprising: performing an antivirus check of the interpreted code.

17. A non-transitory computer readable medium storing thereon computer executable instructions for executing program code by an interpreter, including instructions for:
    executing, by the interpreter, instructions of the program code in an emulated computer environment;
    in response to detecting, by the interpreter, an instruction of the program code associated with an object for which the interpreter lacks a rule of interpretation, halting by the interpreter further execution of the instructions of the program code;
    obtaining, by the interpreter, an auxiliary code corresponding to the object, wherein a result of execution of the auxiliary code corresponds to the result of the execution of the object, and wherein the auxiliary code contains objects for which the interpreter has a rule of interpretation;
    executing, by the interpreter, the instructions of the auxiliary code; and
    after completion of the execution of the auxiliary code, by the interpreter, resuming the execution of the instructions of the program code.

18. The non-transitory computer readable medium of claim 17, wherein the auxiliary code is obtained from the emulated computer environment.

19. The non-transitory computer readable medium of claim 17, wherein the auxiliary code is obtained from a local database or a remote database.

20. The non-transitory computer readable medium of claim 17, wherein the execution of the code and the execution of the auxiliary code includes one or more of: performing lexical analysis of the code; performing syntactical analysis of the code; creating an intermediate code; and interpreting the intermediate code according to the rules of interpretation.

* * * * *